June 11, 1935.  R. F. PEO ET AL  2,004,904
HYDRAULIC SHOCK ABSORBER
Filed May 7, 1934  4 Sheets-Sheet 2
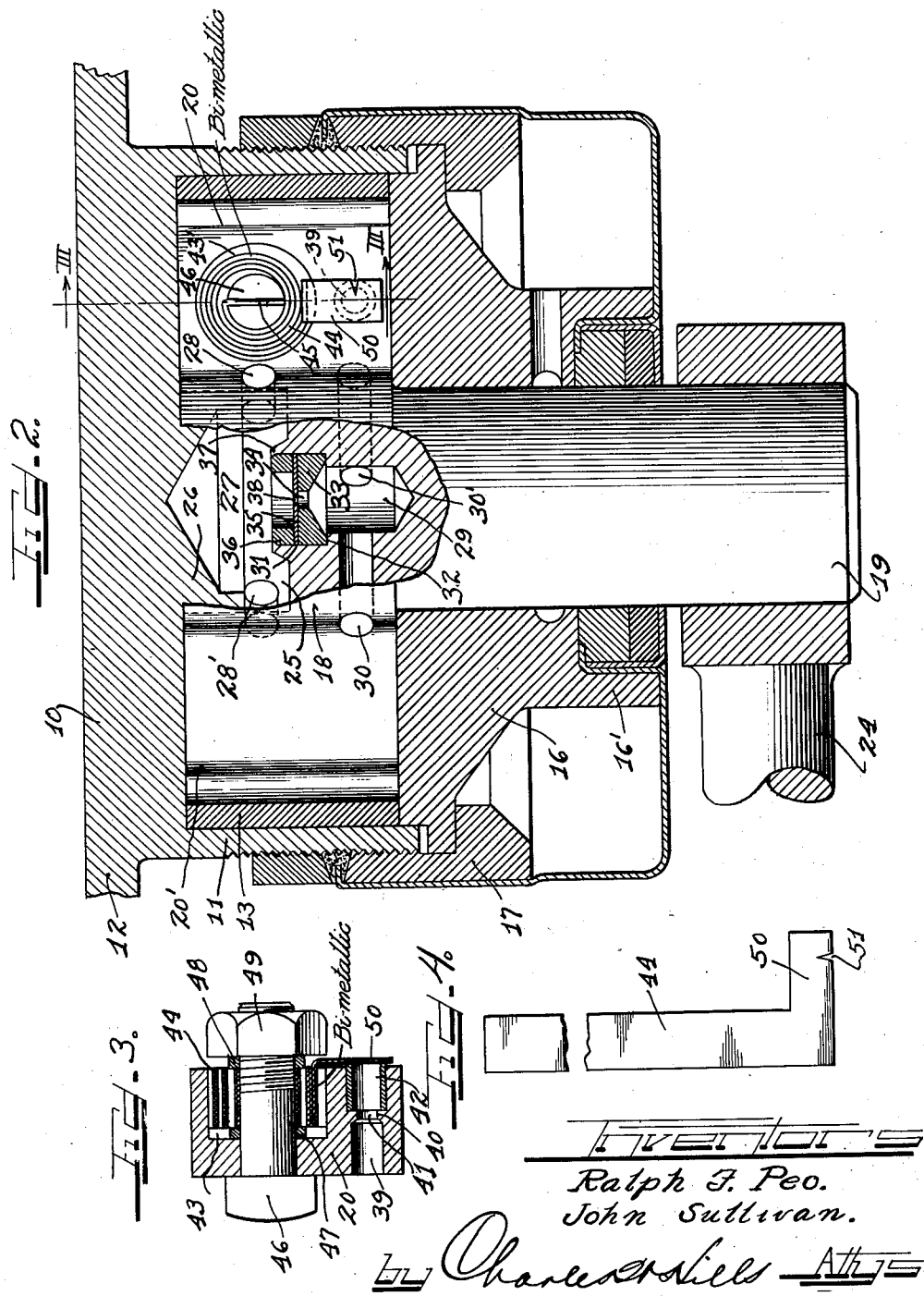
Inventors
Ralph F. Peo.
John Sullivan.
by Charles A. Hills Attys.

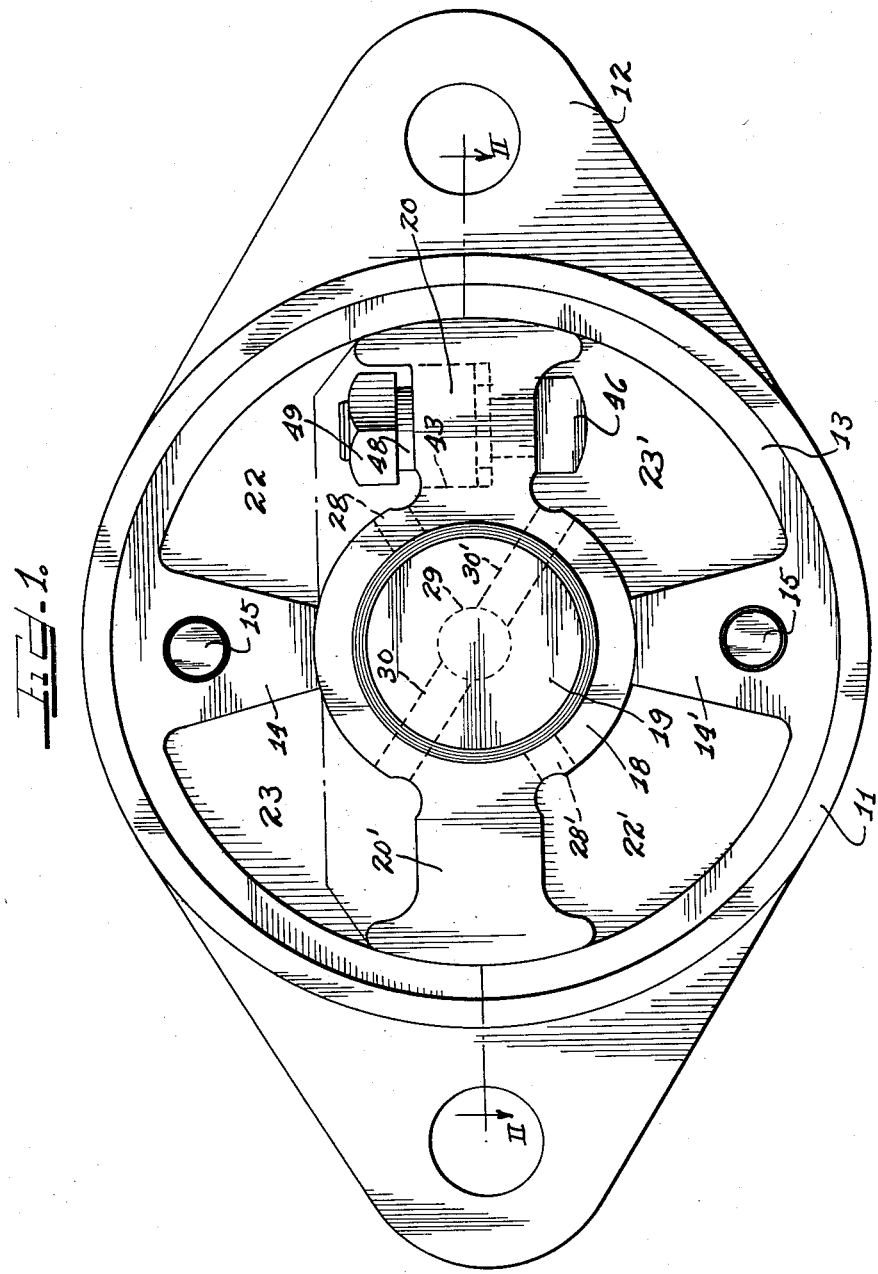

June 11, 1935.  R. F. PEO ET AL  2,004,904
HYDRAULIC SHOCK ABSORBER
Filed May 7, 1934     4 Sheets-Sheet 3
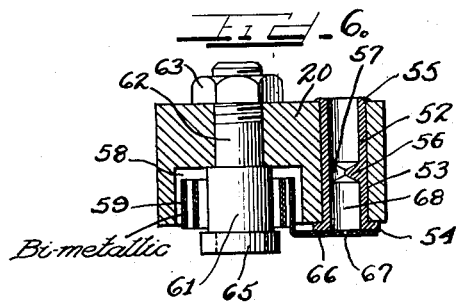
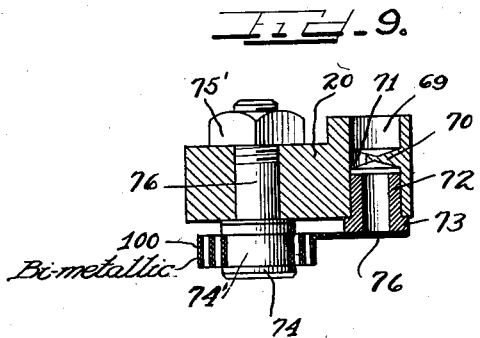
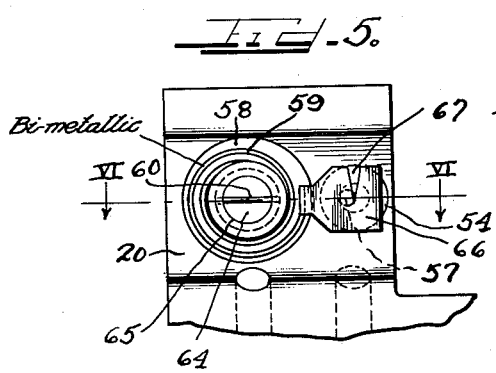
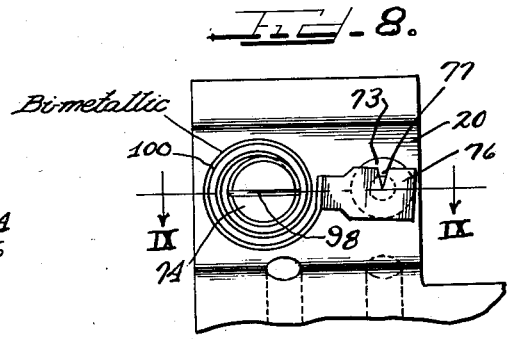
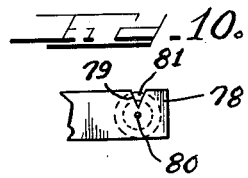
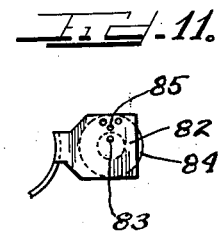
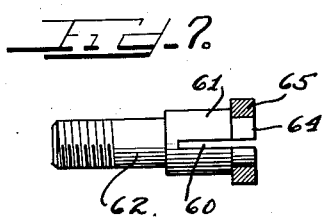
Inventors
Ralph F. Peo.
John Sullivan.
by Charles W. Niels
Attys.

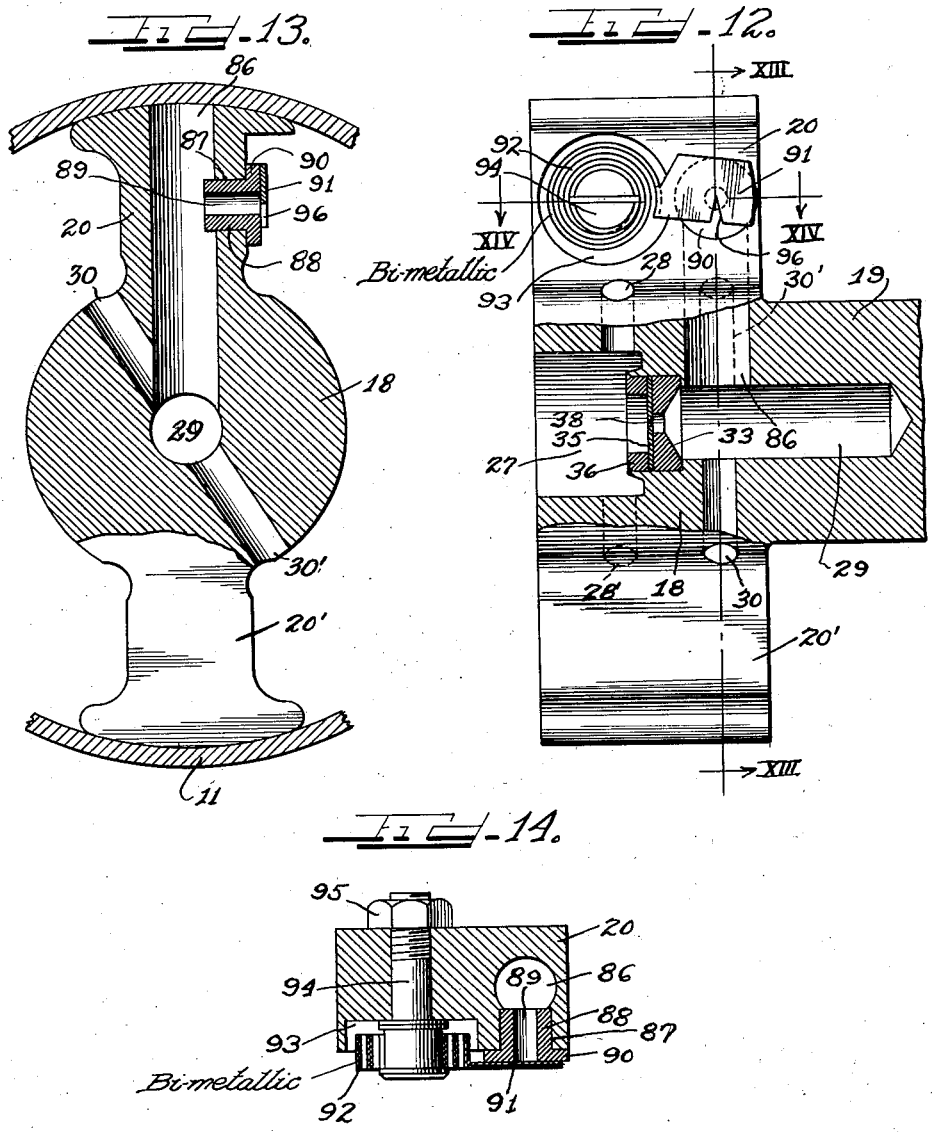

Patented June 11, 1935

2,004,904

UNITED STATES PATENT OFFICE 2,004,904

HYDRAULIC SHOCK ABSORBER

Ralph F. Peo and John Sullivan, Buffalo, N. Y., assignors to Houde Engineering Corporation, Buffalo, N. Y., a corporation of New York Application May 7, 1934, Serial No. 724,288

14 Claims. (Cl. 188—89)

This invention relates to hydraulic shock absorbers and the object is to provide improved means for metering and controlling the flow of the displaced hydraulic fluid so that the shock absorbing characteristics of the shock absorber will not be interfered with by variations in temperature of the fluid.

The important feature of the invention resides in the provision of a passageway between the working chambers of the shock absorber in which passageway is interposed a knife edge orifice for a restricted flow of the fluid at a rate substantially independent of viscosity changes in the fluid, and the provision of a second passage between the working chambers for which second passage a check valve is provided for permitting free flow through the passage from the low pressure to the high pressure chamber and for restricting the passage against flow from the high pressure to the low pressure chamber together with thermostatic means for automatically adjusting the restriction to compensate for variation in temperature of the fluid.

Another feature of the invention resides in the provision of a bimetallic thermostat element whose end forms the check valve and is moved transversely of the passageway by the thermostat element and is provided with a slot for variable overlap of said passageway for metering flow from the high pressure chambers to the low pressure chambers in addition to the flow through the sharp edge orifice.

The various features of our invention are incorporated in the structure shown on the drawings, in which drawings:

Figure 1 is a plan view of a shock absorber with the end wall structure removed;

Figure 2 is a section on plane II—II of Figure 1;

Figure 3 is a section on plane III—III of Figure 2; and

Figure 4 is a developed view of the thermostat element;

Figure 5 is a plan view of a piston vane showing a modified flow controlling arrangement;

Figure 6 is a section on plane 6—6, Figure 5;

Figure 7 is a side view of the supporting and adjusting element for the thermostat coil in Figures 5 and 6;

Figure 8 is a view similar to Figure 5 showing another modified arrangement;

Figure 9 is a section on plane 9—9, Figure 8;

Figures 10 and 11 are plan views of the ends of valves showing modified arrangement of parts;

Figure 12 is a side view of the piston structure, partly in section, showing a modified arrangement for fluid flow;

Figure 13 is a section on plane 13—13, Figure 12; and

Figure 14 is a section on plane 14—14, Figure 12.

Briefly describing the shock absorber to which we have shown our invention applied, it comprises a base 10 having the annular wall 11 extending therefrom and provided with apertured ears 12 by means of which it may be secured to a support such as the chassis of an automotive vehicle. Received within the annular wall 11 is a ring 13 from which diametrically opposite partition lugs 14 and 14' extend radially, this ring structure being rigidly secured by means of pins 15 extending through the partition lugs and into the base 10.

An end or cover wall 16 abuts the ring and partition lugs and is held in place by an annular nut or collar 17 abutting the wall and having threaded engagement with the outside of the annular wall 11. A cylindrical piston hub 18 extends between the base 10 and wall 16 and between the partition lugs 14 and 14' and has a shaft 19 extending therefrom for bearing engagement in the wall 16 and its bearing extension 16'.

The piston hub 18 has the diametrically opposite vanes 20 and 20' extending therefrom and these vanes together with the partition lugs divide the space within the ring 13 into high pressure chambers 22 and 22' and low pressure chambers 23 and 23' between which the hydraulic fluid flows when displaced by the vanes during oscillation of the piston structure, the shaft 19 at its outer end having a lever 24 extending therefrom which is connected usually with the axle of the automotive vehicle.

At its inner end the piston hub has the cylindrical recess 25 for receiving the centering and bearing lug 26 on the base 10, the space or chamber 27 being left between the lug and the shaft. This space is connected with the high pressure chambers 22 and 22' by the passages 28 and 28' respectively extending through the piston hub wall.

A bore 29 leads into the piston hub from the recess 25 to form a chamber which at its inner end is connected with the low pressure chambers 23 and 23' by passages 30 and 30' respectively extending through the piston hub.

At its outer end the bore 29 is of increased diameter to form a pocket 31 and an annular shoulder 32. An abutment member 33 fits into the pocket and rests against the shoulder and has the axial passage 34 therethrough. A thin metallic disc 35 is clamped against the abutment member 33 by a ring 36 which may be secured by threading into the pocket 31 or as shown may be secured in place by deflection against the outer face thereof of the metal at the outer edge of the pocket 31, as indicated at 37. The disc 35 has the opening 38 therethrough forming a sharp edge orifice in registration with the passage or port 34 in the abutment member 33. As the piston structure oscillates, the displaced hydraulic fluid will flow back and forth through this sharp edge orifice which will meter the flow and will tend to compensate for variations in viscosity caused mostly by variation in temperature of the fluid so as to maintain the resistance to such flow constant.

The knife edge orifice will effect practical and efficient compensation during a normal range of temperature variation but frequently the shock absorber will be subjected to abnormal temperatures and provision should therefore be made for assisting the orifice during such abnormal temperature conditions. Furthermore it is usual to provide for less resistance and easier flow of the hydraulic fluid during the bump stroke of the piston structure, that is, when the vehicle springs are flexed, as when the vehicle body and axle approach each other. We provide simple means for relief of resistance during the bump stroke and for assisting the sharp edge orifice 38 in properly metering the flow and compensating for temperature variations, particularly during the rebound strokes of the piston structure, that is when the vehicle springs rebound.

In the arrangement shown in Figures 1-4, the piston vane 20 has an auxiliary passage 39 extending transversely therethrough into which projects the annular flange 40 forming the metering port or orifice 41. The upper end of the passageway 39 communicates with the high pressure chamber 22 and the lower end communicates with the low pressure chamber 23', and in the upper end is inserted a bushing 42 which seats against the flange 40 and projects a slight distance beyond the upper face of the vane 20 to form a valve seat. Adjacent to the passageway 39 and in the upper side of the vane 20 is the cylindrical recess or pocket 43 for receiving a thermostat element 44 which, as shown, may be in the form of a spiral coil of bimetal. The inner end of the coil engages in the longitudinal slot 45 in the shank of a bolt 46 which extends through the bottom of the pocket 43 with its head abutting the under face of the vane 20. A washer 47 is interposed between the inner portion of the coil and the bottom of the pocket 43 and another washer 48 is interposed between the inner portion of the coil and a nut 49 for the bolt so that the coil may be clamped and held at its inner end, leaving the outer portion of the coil free for winding or unwinding in response to temperature change.

The outer end of the coil band is deflected outwardly at right angles to the coil axis to provide the plate or wing 50 which overlies the outer end of the bushing 42 to act as a valve for controlling the flow through the passageway 39. The body of the coil acts as a spring tending to hold the valve plate seated against the outer end of the bushing 42 so as to cut off flow through the passage 39 during rebound stroke of the piston structure. During the bump stroke the pressure of the fluid flow through the passageway 39 will lift the valve plate against the spring resistance of the coil so that the fluid may readily flow and be metered and resisted only by the orifice 41 which is large as compared to the size of the orifice 38. The plate or wing 50 extending from the thermostat coil thus acts as a check valve.

As the temperature changes, the thermostat coil will tend to wind or unwind and thereby cause shift of the valve plate 50 on the seat bushing 42 in a direction transversely of the passageway 39. We have shown a slot 51 cut in the valve wing 50 inwardly from one side edge thereof, this slot being preferably of varying width, being V-shaped as shown. The arrangement is such that with decreasing temperature the thermostat coil will tend to unwind and to thereby shift the valve for greater overlap of the slot 51 with the passageway 39, and with increasing temperature the thermostat coil will tend to wind up and cause shift of the valve wing in the opposite direction to lessen the degree of overlap.

By loosening the nut 49 the bolt 46 may be turned for proper setting of the valve for normal temperature operation. The slot orifice 51 may be entirely closed or in partial overlap with the passageway 39 during normal temperature, depending upon the operation of the orifice 38. The thermostat control valve will then cooperate with the orifice 38 to meter the flow from the high pressure chambers to the low pressure chambers and to compensate for variation in temperature. The flow from the low pressure chambers to the high pressure chambers will be mainly through the passageway 39 under metering control by the orifice 41, only part of the fluid flow being through the orifice 38.

The flow from the low pressure chambers to the high pressure chambers occurs when the piston structure rotates in clockwise direction, Figure 1, for the bump strokes. The valve 50 will readily yield to such flow so that the passageway 39 will be practically unobstructed except for orifice 41.

The flow from the high pressure chambers to the low pressure chambers occurs during the rebound of the vehicle springs and movement in counterclockwise direction of the piston structure, the pressure forcing the valve 50 against its seat 42. The flow will be from the high pressure chambers through the ports 28 and 28' into the space 27 and then through the sharp edge orifice 38 into the chamber 29 and from there to the ports 30 and 30' into the low pressure chambers. While the notch 51 in the valve 50 is in overlap with the passageway 39 some of the fluid will flow from the high pressure chambers into the low pressure chambers through the exposed notch. The adjustment of the thermostat may be such that the orifice 51 will be closed during normal temperature and will be opened only when the temperature decreases beyond a normal range, or, the orifice 51 may be open at all times but the area of the opening automatically controlled by the thermostat as the temperature varies. When the temperature increases, the available passage through the orifice 51 will be decreased and when the temperature decreases the available size of the orifice will increase so that change in viscosity resulting from change in temperature will be compensated for and the shock absorbing characteristics of the shock absorber maintained throughout a wide range of temperature and viscosity variations.

The thermostat coil is fully protected within the pocket 43 and besides functioning thermostatically to shift the valve for setting of the orifice 51 it also serves the function of a spring tending to resist deflection of the valve during flow from the low pressure chambers to the high pressure chambers and to keep the valve seated. This combined thermostat and valve structure can be very readily and economically manufactured and installed.

Figures 5, 6 and 7 show a modified arrangement. Here a bushing 52 extends entirely through the transverse passageway 53 shown in the piston vane 20. The bushing, at its end exposed to the high pressure chamber, has a valve seating flange 54 engaging the adjacent face of the vane, and the other end of the bushing is deflected over against the opposite face of the vane as indicated at 55 in order that the bushing may be rigidly held in the passage 53. Intermediate its ends the bushing has the cross wall 56 with a port 57 therethrough forming a metering orifice for flow from the low pressure to the high pressure side of the vane, this orifice being offset to one side of the center of the cross wall 56 for a purpose to be specified later.

Adjacent to the bushing the vane 20 has a pocket 58 for receiving the bimetal thermostat coil 59 whose inner end engages in the slot 60 in the cylindrical shank 61 of a bolt 62 which extends through the vane to receive the nut 63 between which nut and the head the vane is clamped to thus secure the head and thermostat coil in adjusted position. The bolt has the reduced end or neck 64, which, after application of the thermostat coil to the bolt head, receives a collar 65 so that the coil end will be held against axial movement between the bottom of the slot 60 and the collar.

The outer end of the thermostat coil is deflected to form the valve plate 66 which is normally held by the spring action of the coil against the bearing flange 54 of the bushing 52 and which has the V-shaped orifice notch 67 adapted for variable overlap with the bore of the bushing 52 as the valve plate 66 is shifted laterally by the winding or unwinding of the thermostat coil in response to temperature change. Flow from the low pressure to the high pressure side of the vane raises the valve plate against the spring resistance of the coil for comparatively free flow of the fluid under the restriction only of the comparatively large orifice 57. The flow from the high pressure to the low pressure side of the vane is checked by the seating of the valve plate and is restricted to the end of the orifice notch which overlaps the bore of the bushing 52. The space within the bushing between the valve plate and the bushing wall containing the orifice 57 forms a relief or expansion chamber 68 in which the high pressure flow through the restricted orifice 67 may dissipate some of its velocity before the fluid passes through the offset orifice 57, the arrangement eliminating the so-called swishing noise.

In the arrangement of Figures 5 and 6, and also in the arrangement of Figures 2 and 3 the width of the valve plate may be the same as the diameter of the seating flange on the respective bushing, and the orifice notch is located so that when the thermostat coil is adjusted for normal temperature setting the valve plate side edges will register with the opposite sides of the bushing. After such setting the degree of overlap of the orifice slot will be that for volume of flow through the orifice at normal temperature, say 70° F.

In the modified arrangement of Figures 8 and 9 the passageway 69 through the piston vane has the cross wall 70 intermediate its ends provided with the orifice 71 offset from the center of the passageway, and in the high pressure end of the passageway is inserted the bushing 72 with the seating flange 73. In the arrangement shown for the thermostat coil, no recess is provided therefor, the coil being mounted with its inner end in the circumferential channel 74' in the head 74 of the bolt 75 extending through the vane and locked in adjusted position by a nut 75'. The bolt head has the diametral slot 98 into which the inner end of the coil 100 extends, the coil being readily expansible to be slipped over the outer end of the head and into the channel 74'. The outer end of the coil is deflected to form a valve plate 76 which has the orifice notch 77 adapted for variable overlap with the bore through the bushing 72 so as to meter the flow from the high pressure to the low pressure side of the piston structure. To facilitate adjustment of the thermostat the orifice notch 77 is so arranged adjacent to one side edge of the valve plate that when the opposite edge alines with the edge of the seating flange 73 the overlap of the orifice will be that for flow control at normal temperature.

In the arrangement shown in Figure 10 a restricted orifice 80 is provided in the valve plate 78 in addition to the notch orifice 79, this orifice 80 communicating at all times with the bore in bushing 81. The orifice notch will then, by its varying overlap with the bushing bore during change in temperature, increase or reduce the total available flow passage from the high pressure to the low pressure side.

In the arrangement of Figure 11 the valve plate 82 has the restricted orifice 83 therethrough which may always be in communication with the bore through the seat bushing 84 while a row or cluster of other orifices 85 may be consecutively brought into registration with the bushing bore as the temperature decreases so as to increase the available flow passage with decreasing temperature.

These orifices may be knife edged in order to meter the fluid flow independently of viscosity changes.

In Figures 12, 13 and 14 a modified arrangement is shown for the flow of fluid between the high pressure and low pressure chambers of the shock absorber. Like in the arrangement of Figures 1 and 2 a disc 35 providing the knife edge orifice 38 may be interposed between the chambers 27 and 29, with the passages 28 and 28' leading from chamber 27 to the high pressure working chambers and passages 30 and 30' leading from chamber 29 to the low pressure working chamber of the shock absorber. However, instead of having an auxiliary passage extending transversely through the piston vane for direct connection of the high and low pressure chambers, a bore 86 is extended radially through the vane 20 and the piston hub 18 to the chamber 29 which is connected with the low pressure working chambers, the outer end of the passage 86 being closed by the annular wall 11 of the shock absorber housing. On the high pressure side the vane 20 has the opening 87 for receiving the bushing 88 whose bore 89 connects the high pressure side of the vane with the passage 86, the outer end of the bushing having the seating flange 90 for the valve plate 91 at the outer end of the theremostat coil 92 which extends partly into a pocket 93 formed in the vane adjacent to the bushing, the coil being anchored at its inner end to the head of a bolt 94 which is secured by a nut 95. The valve plate has the orifice notch 96 for variable overlap with the bushing bore as the temperature changes.

During the low pressure stroke of the shock absorber most of the displaced fluid flows through the passages 30 and 30' into the chamber 29 and from there through the passage 86 and through the bushing bore 89 past the valve 91 and into the high pressure working chamber, part of the fluid flowing from the chamber 29 through the orifice 38 and through the passages 28 and 28' to the high pressure working chambers. During the high pressure stroke or rebound stroke of the shock absorber the valve plate 91 is forced against its seat, part of the displaced fluid then flowing through 28 and 28', through the orifice 38 to chamber 29 and from there through passages 30 and 30' into the low pressure working chambers, the balance of the fluid flowing through the restricted thermostat controlled orifice 96 into the passage 86 and from there to the chamber 29 and through passages 30, 30' to the low pressure working chamber.

For some kinds of service the thermostat controlled valve could be relied upon solely for controlling the fluid flow. In that case, in the structure shown, there would be a solid wall between the chambers 27 and 29, or, a solid continuous disc could be substituted for the orificed disc 35.

It is also evident that the thermostat controlled valve structure could be applied to one of the partition lugs 14, 14' instead of to one of the piston vanes.

We have shown practical and efficient embodiments of the various features of our invention but we do not desire to be limited to the exact construction, arrangement and operation shown and described as changes and modifications may be made without departing from the scope of the invention.

We claim as follows:

1. In a hydraulic shock absorber, the combination of a housing forming a chamber for hydraulic fluid, a piston structure operable within said chamber to displace the fluid therein, a passageway for the flow of hydraulic fluid from one side of the piston structure to the other, a thermostat element having a portion thereof formed to provide a valve extending transversely of said passageway, said valve portion having a restricted port arranged for variable exposure to said passage as said thermostat element responds to temperature changes.

2. In a hydraulic shock absorber, the combination of a housing forming a chamber for hydraulic fluid, a piston structure operable within said chamber to displace the fluid therein, a passageway for the flow of hydraulic fluid from one side of the piston structure to the other, a thermostat element in the form of a bimetal coil, one end of said coil being shaped to form a valve for closing said passage against unrestricted flow and having a port arranged for varying exposure to said passage as said coil winds or unwinds in response to temperature changes.

3. In a hydraulic shock absorber, the combination of a housing forming a chamber for hydraulic fluid, a piston structure operable within said chamber to displace the fluid therein, a passageway for the flow of hydraulic fluid from one side of the piston structure to the other, a thermostat element in the form of a bimetal band anchored at one end and having its outer end shaped to form a valve plate for normally closing said passageway against unrestricted flow therethrough in one direction, said thermostate element being yieldable for movement of said valve plate away from said passageway in the direction of the axis thereof for unrestricted flow through said passageway in the opposite direction, said thermostat element being arranged to move said valve in the direction at right angles to the axis of said passageway in response to temperature changes, and a restricted port through said valve plate arranged for variable exposure to said passageway as said valve plate is moved by said thermostat element in response to temperature change.

4. In a hydraulic shock absorber, the combination of a housing forming a chamber for hydraulic fluid, a piston structure operable within said chamber to displace the fluid therein, a passageway for the flow of hydraulic fluid from one side of the piston structure to the other, a thermostat element in the form of a bimetal band anchored at its inner end with its outer end extending across and normally seated over one end of said passageway to close said passageway against unrestricted fluid flow therethrough in one direction, said thermostat element being yieldable to open said passageway to unrestricted flow therethrough in the opposite direction, the outer end of said thermostat element having a slot and said thermostat element being arranged to shift said outer end for variable overlap of said slot with said passageway as said element responds to temperature changes whereby to correspondingly restrict the flow through said passageway in the first mentioned direction.

5. In a hydraulic shock absorber, the combination of a housing, a shaft journalled in said housing, a piston on said shaft and traversing the space between said shaft and housing, a stationary element in said housing and traversing the space between said shaft and housing, said piston and stationary element forming a pair of working compartments, a passage connecting said compartments, a valve for said passage machined to provide a port, a separate recess at one side of said passage, and a thermostat element within said recess and connected with said valve and adapted to move said valve for setting of its port relative to said passage whereby to regulate the flow of fluid through said passage.

6. In a hydraulic shock absorber, the combination of a housing, a stationary element and a movable element in said housing dividing said housing into working compartments for containing hydraulic fluid, a passageway through one of said elements and a recess adjacent thereto, a thermostat element in the form of a bimetal band having its inner end anchored within said recess and having its outer end extending across normally against the adjacent end of said passageway to form a valve, said thermostat element being yieldable whereby said valve may be lifted from said passageway end by flow through said passageway in one direction, said thermostat element being arranged to shift said valve laterally for variable exposure of said passageway to flow through said passageway in the opposite direction as said thermostat element responds to temperature changes.

7. In a hydraulic shock absorber, the combination of a housing, a movable element and a stationary element within said housing dividing the space therein into working compartments, one of said elements having a passageway therethrough and a recess adjacent to said passageway, a thermostat element in the form of a bimetal coil within said recess and having its outer end extending against the adjacent side of said element and over the corresponding end of said passageway to form a valve, said valve being shiftable laterally by the winding or unwinding movement of said thermostat coil in response to temperature changes for controlling the flow through said passageway.

8. In a hydraulic shock absorber, the combination of a housing, a movable element and a stationary element within said housing dividing the space therein into working compartments for containing hydraulic fluid, one of said elements having a passageway therethrough from one compartment to the other and a recess adjacent to said passageway, a thermostat element in the form of a bimetal coil within said recess and having its inner end anchored to said element, the outer end of said coil being deflected to form a valve plate extending across the adjacent end of said passageway, said thermostat coil acting as a spring tending to hold said valve plate against the respective end of said passageway and to yield for movement of said valve in the direction of the axis of said passageway for unrestricted flow of fluid from the opposite end of said passageway, said valve being shiftable transversely of said passageway by the winding or unwinding movement of said coil in response to temperature changes for variable restricted exposure of said passageway for flow therethrough in the opposite direction.

9. In a hydraulic shock absorber, the combination of a housing forming a chamber for hydraulic fluid, a piston structure operable within said chamber to displace the fluid therein, means forming a passageway for the flow of hydraulic fluid from one side of the piston structure to the other and a restricted sharp edge orifice interposed in said passageway, means providing an auxiliary passageway for the flow of fluid from one side of the piston structure to the other and a recess adjacent to said auxiliary passageway, a thermostat element in the form of a bimetal coil within said recess and having its outer end projected across the adjacent end of said auxiliary passageway to form a valve, said coil serving as a spring tending to seat said valve against the passageway end to seal said passageway against unrestricted flow therethrough from said end but permitting said valve to unseat for unrestricted flow in the opposite direction through said auxiliary passageway, said thermostat coil when winding or unwinding in response to temperature change causing lateral shift of said valve, and a restricted port through said valve arranged for variable overlap of said auxiliary passageway during such shift of the valve to correspondingly control the restricted flow through said auxiliary passageway.

10. In a hydraulic shock absorber, the combination of a housing forming high and low pressure chambers for hydraulic fluid, a piston structure operable to displace said fluid from one chamber to the other, means providing a passageway for flow of fluid between said chambers and a sharp edge restricted orifice interposed in said passageway, means providing an auxiliary passageway for the flow of fluid between said chambers, a thermostat element in the form of a bimetal band anchored at its inner end adjacent to the high pressure chamber end of said auxiliary passageway and having its outer end extending across said passageway end to form a valve, said thermostat element tending to hold said valve seated over said end of said auxiliary passageway to close said passageway against unrestricted flow from the high pressure to the low pressure chambers but being yieldable to permit lifting of said valve for unrestricted flow through said auxiliary passageway from the low pressure to the high pressure chambers, said thermostat element being arranged to shift said valve laterally in response to temperature changes for variable restricted flow through said auxiliary passageway from the high pressure to the low pressure chambers for cooperation with said knife edge orifice to keep the flow from the high pressure to the low pressure chambers independent of temperature and viscosity change.

11. In a hydraulic shock absorber, the combination of a housing, a stationary member in said housing and a movable member therein for displacing hydraulic fluid, there being a passageway through one of said elements having a cross wall intermediate its ends provided with an orifice at one side of the wall center, a thermostat element in the form of a bimetal coil, one end of said coil being shaped to form a valve extending across one end of said passageway and having a port arranged for varying exposure to said passageway as said coil winds or unwinds in response to temperature changes, said valve closing said passageway against flow therethrough in one direction except through said valve port, said thermostat coil permitting yield of said valve for freer flow through said passageway in the opposite direction, the space between said valve and said cross wall forming an expansion chamber for dissipating the velocity energy of the fluid flowing through said valve port before said fluid reaches the port in said cross wall.

12. In a hydraulic shock absorber, the combination of a housing forming a chamber for hydraulic fluid, a piston shaft extending into said housing and having a vane thereon for displacing the hydraulic fluid when the shaft is oscillated, there being a passageway extending through said vane and said shaft and terminating in said housing at one side of said vane, said vane having a port extending therethrough from the other side thereof and to the passageway therein, a thermostat in the form of a coil mounted on said vane and having its outer end shaped to form a valve plate extending over the outer end of said port, said valve plate having an orifice slot therein arranged for varying exposure to said port as said coil winds or unwinds in response to temperature changes.

13. In a hydraulic shock absorber, the combination of a housing forming a chamber for hydraulic fluid, a piston structure operable within said chamber to displace the fluid therein, a passageway for the flow of hydraulic fluid from one side of the piston structure to the other, a thermostat element having a portion thereof formed to provide a valve extending transversely of said passageway and having a metering slot therethrough of varying width, said thermostat element being arranged to function mechanically as a spring tending to move said valve in one direction to hold it over one end of said passageway and to function thermostatically to shift said valve in a direction at right angles to said first mentioned direction for variable overlap of said passageway by said valve metering slot in accordance with change in temperature of the fluid.

14. In a hydraulic shock absorber, the combination of a housing forming a chamber for hydraulic fluid, a piston structure operable within said chamber to displace the fluid therein, a passageway for the flow of hydraulic fluid from one side of the piston structure to the other, and a thermostat element having a portion thereof formed to provide a valve extending transversely of said passageway, said valve having a plurality of knife edge orifices therethrough one or more of which is exposed to said passageway as said thermostat responds to change in temperature of the fluid.

RALPH F. PEO.
JOHN SULLIVAN.